UNITED STATES PATENT OFFICE.

WALTER A. ASPINALL, OF BROOKLYN, NEW YORK.

IMPROVEMENT IN MEDICINAL PREPARATIONS OF IRON.

Specification forming part of Letters Patent No. 115,805, dated June 13, 1871.

I, WALTER A. ASPINALL, of Brooklyn, in the county of Kings and State of New York, have invented a new and useful Improvement in the Mode of Putting up Iron, of which the following is a specification:

My invention consists in a novel way of putting up iron in form of a jelly, in which form it is pleasant and palatable to take as a medicine.

I use the following ingredients in about the following proportions: Tinct. *ferri chloridi*, one part, fluid; glycerine, one part, fluid; *sirupus simplex*, two parts, fluid; mucilage, (gum acacia,) four parts, fluid; *spiritus limonis*, one-fourth part, fluid.

I first mix the iron and the glycerine in a suitable mortar, and then add the lemon; I then mix the sirup and the mucilage thoroughly, and put all together in the mortar, stirring them briskly until the whole mass forms a stiff jelly.

This I term "jellate of or gelatinized iron," and put it up in suitable glass bottles in quantities to suit the trade.

I do not confine myself to the exact proportions of the above-named ingredients, as I may vary them somewhat without destroying the character of the jellate.

Having thus described my invention, I claim—

The compound of iron, which I call jellate of or gelatinized iron, composed of the ingredients in about the proportions herein described.

WALTER A. ASPINALL.

Witnesses:
E. ASPINALL,
H. P. THOMPSON.